United States Patent [19]

Hayashi

[11] Patent Number: 6,045,748

[45] Date of Patent: Apr. 4, 2000

[54] METHOD FOR MOLDING AN ARTICLE FROM POWDER

[75] Inventor: Shinzo Hayashi, Obu, Japan

[73] Assignee: NGK Insulators, Ltd., Japan

[21] Appl. No.: 09/124,282

[22] Filed: Jul. 29, 1998

[30] Foreign Application Priority Data

Aug. 6, 1997 [JP] Japan .................................. 9-211550

[51] Int. Cl.$^7$ ................................. C04B 35/632
[52] U.S. Cl. ..................... 264/669; 264/670; 264/109; 419/34; 419/35; 419/36; 419/37; 419/64; 419/65
[58] Field of Search ................... 264/669, 670, 264/109; 419/34, 35, 36, 37, 64, 65

[56] References Cited

U.S. PATENT DOCUMENTS

| | | | |
|---|---|---|---|
| 4,113,480 | 9/1978 | Rivers . | |
| 4,443,392 | 4/1984 | Becker et al. | 264/133 |
| 4,889,672 | 12/1989 | Akutsu et al. | 264/670 |
| 5,028,362 | 7/1991 | Janney et al. . | |
| 5,258,151 | 11/1993 | Bayer et al. | 264/670 |
| 5,283,213 | 2/1994 | Ohst et al. | 264/670 |
| 5,720,911 | 2/1998 | Taylor et al. | 264/670 |

FOREIGN PATENT DOCUMENTS

| | | |
|---|---|---|
| 3-19802 | 1/1991 | Japan . |
| 5-178652 | 7/1993 | Japan . |
| 5-48724 | 7/1993 | Japan . |
| 7-22931 | 3/1995 | Japan . |
| 8-127087 | 5/1996 | Japan . |
| 88/07902 | 10/1988 | WIPO . |
| 88/07903 | 10/1988 | WIPO . |

OTHER PUBLICATIONS

Abstract of JP408276410 Oct./1996.
"Gelcasting–A New Ceramic Forming Process", Ceramic Bulletin, Vo. 70, No. 10, 1991, pp. 1641–1649.
"Enzyme Catalysis of Ceramic Forming", Journal of Mat. Education 1995.

*Primary Examiner*—James Derrington
*Attorney, Agent, or Firm*—Wall Marjama Bilinski & Burr

[57] ABSTRACT

A method for forming molded articles in any shape from ceramic, glass, or metal powders which comprises: preparing a slurry by dispersing more than one powder selected from a group consisting of ceramic, glass, and metal materials in a dispersing medium using a dispersing agent, and curing by adding a reactive substance that reacts with the dispersing agent to make the dispersibility of the dispersing agent disappear or lower.

6 Claims, No Drawings

METHOD FOR MOLDING AN ARTICLE FROM POWDER

BACKGROUND OF THE INVENTION AND RELATED ART STATEMENT

The present invention relates to a method for molding an article by using ceramic or glass or metal powders, and more specifically, to a method for curing a highly concentrated slurry of the powders in a dispersed state by a dispersing agent by adding a specific reactive substance to the slurry to destroy the dispersed state.

In order to mold an article from materials such as ceramic or metal powders, or mold cermet materials, and inclined functional materials in which ceramic and metal powders are mixed, compression molding, extrusion, injection molding, casting and the like have been used to form various high-strength materials which excel in heat resistance and wear resistance.

There is no need to say that those forming methods have various advantages. On the other hand, however, compression molding, for example, is limited to forming simple shapes such as discs or prisms, and extrusion is limited to forming products having a constant profile in the cross-section vertical to the extruding direction, such as rods and honey-combs. In order to form products having complicated shapes using such methods, the molded green body must be calcined into an article having a suitable strength, processed mechanically, and then finally sintered.

In injection molding, since large quantities of a resin and a binder must be added to the material powder, the density of the molded articles is low, the degreasing process takes a long time, and sintering shrinkage is large. Therefore, the use of injection molding is limited to relatively small products having complicated shapes.

Furthermore, casting has problems in that the mechanical strength of the molded articles is low. Moreover, the production of a plurality of products having a thickness of a certain level is difficult due to the fluctuation in the conditions of slurry to be controlled in the case of the slurry removal method; and that the internal defects such as shrinkage cavities are easily produced in the case of the solid method. In either method, the dispersed state of the slurry must be maintained always at a predetermined, preferable state.

In order to solve such problems in conventional methods, methods for forming an article from powders, which facilitate forming and processing into complicated shapes, and producing uniform products with small sintering shrinkage, have been investigated. The near-net method in which a slurry is produced by dispersing a large quantity of powders and then curing the slurry is one of the solutions. According to the near-net method, a product having a complicated shape can be produced by the use of a mold having the intended shape. The uniformly dispersed state of the slurry results in a dense packing of powders in the molded articles.

As one of such near-net methods, the inventors of the present invention have developed a method for obtaining elastic molded articles by curing water-based slurry containing a large quantity of powders by adding various water-absorbing substances to the slurry as disclosed in the Japanese Patent Application Laid-Open No. 8-127087. Also, in Japanese Patent Publication No. 5-48724, a method is disclosed for forming by freezing the dispersing agent in the slurry, and in Japanese Patent Publication No. 7-22931, a method is disclosed for obtaining molded articles by adding a resin and its curing agent to the slurry.

However, in the molding method from powders using the water-absorbing substances or the resin and its curing agent, there is limitation in increasing the density of the molded articles because resins and the like, which are not required in the final products, are added to the slurry. Also, since the viscosity of the slurry increases sharply by the addition of resins and the like, the workability of molding is worsened, and studies for further improvement are required. Furthermore, in the method in which the dispersing agent in the slurry is frozen, the temperature for forming and of the molded articles must be controlled strictly, and when the molded articles are processed before freeze-drying, they must be processed under a temperature condition at which the molded articles are solid.

SUMMARY OF THE INVENTION

The present invention has been devised to solve the problems in conventional methods for forming an article from powders, and to improve the near-net forming method. It is an object of the present invention to provide a novel method for forming an article from powders in which a slurry is cured without adding a large quantity of a resin and the like, and in which a strict temperature control is not required during the curing operation.

According to the present invention, there is provided a method for molding an article from powders comprising steps of preparing a slurry from at least one powder selected from a group consisting of ceramics, glass, and metals by dispersing said powder in a dispersing medium through the use of a dispersing agent, and curing said slurry by adding a reactive substance which prevents or lowers the dispersibility of said dispersing agent through the interaction with said dispersing agent.

In this molding method, an organic solvent is preferably used as the dispersing medium, and one of compounds selected from a group consisting of amine compounds, organic compounds having hydroxyl groups, alcoholic esters, and organic metal complex compounds, is preferably used as the dispersing agent. As the reactive substance which reacts with the dispersing agent, one of compounds selected from a group consisting of isocyanates, epoxy compounds, lactone compounds, amine compounds, acid anhydrides, and isothionates is preferably added.

DETAILED DESCRIPTION OF PREFERRED EMBODIMENT

The method for molding an article from powders according to the present invention has advantages that molding can be performed using a simple equipment because the molded articles can be produced by curing a slurry, in which powders are dispersed in a high concentration, with the addition of a small quantity of a reactive substance capable of reacting with a dispersing agent, and that degreasing can be performed easily because the molded articles contain only a small quantity of organic substances that otherwise makes degreasing difficult.

The preferred embodiments of the present invention will be described in detail below, but the present invention is in no way limited by these embodiments.

When a slurry is produced by suspending ceramic or metal powders in a dispersing medium, the slurry exhibits a Newtonian flow if the concentration is low and the frequency of the powders contacting with each other is low. However, if the concentration of the powders increases, the slurry will not exhibit a Newtonian flow, but an abnormal flow such as thixotropic flow and plastic flow.

In order to produce a slurry having a high concentration of the powders but a low viscosity, and exhibiting no abnormal flow as described above, a dispersing agent (dispersing agent) is generally added to the slurry. For example, for producing a slurry exhibiting a Newtonian flow without using dispersing agents, the quantity of the dispersing medium required is 65 percent relative to the total quantity of the slurry. However, when a small quantity of a dispersing agent is used, the quantity of the dispersing medium can be decreased to 40 percent.

Here, it has been thought that if the dispersing agent could be removed after the slurry had been filled in a container of a certain shape, or if the dispersibility could be removed from the dispersing agent, the slurry could be cured without adding a large quantity of resins as in the conventional near-net forming, and molded articles in which powders were uniformly packed could be produced.

However, the removal of only the dispersing agent out of the slurry is considered to be impossible. The inventors have examined the behaviors and the electrical properties of the dispersing agent in the slurry, and conceived that the slurry might be cured by promoting the aggregation of powders by the addition of a reactive substance in a small quantity equal to the quantity of a dispersing agent, when a dispersing agent and a substance capable of reacting therewith is chosen in such a specific combination that the dispersibility of the dispersing agent lowers or disappears.

In the present invention, therefore, a slurry in which powders are dispersed in a dispersing medium using a dispersing agent must be prepared. As the powders, various ceramic powders, such as oxides, nitrides, and carbides; glass powders; and metal powders are preferably used. Powders for a cermet material prepared by mixing ceramic and metal powders, or mixed powders for preparing fiber reinforced ceramics (known as FRC) or fiber reinforced metal (known as FRM) using fibrous powders or whiskers as an additive component (small-quantity component) or a structure reinforcing component in composite materials, can also preferably be used.

The dispersing media used for preparing the slurry are roughly divided into aqueous media and organic solvent media. The organic solvent media include paraffin, isoparaffin, toluene, xylene, and petroleum ether.

The dispersing agent is chosen, taking into consideration the reactivity with the reactive substance described later, and amine compounds, organic compounds having hydroxyl groups (—OH groups), alcoholic esters, or organic metal complex compounds represented by the general formula, RO-Me (in which R denotes an alkyl group, and Me denotes a metal) are preferably used. When organic metal complex compounds are used, however, since the metal components often remain in the final products, they should not be used when the purity of the material is required.

A slurry is prepared by mixing the powders, the dispersing medium, and the dispersing agent as described above, and the methods for preparing the slurry are not limited to a specific one. For example, the method using a ball mill pot is suitable for preparing the slurry having uniform particle distribution because it gives good dispersion, and aggregated secondary particles can be ground into primary particles. When well-dispersible powders, such as surface-treated powders for casting, are used, an emulsifier, such as a homogenizer or a disperser, can be used.

Next, molding is performed by adding a reactive substance capable of reacting with the dispersing agent to the prepared slurry and mixing them. Here, since the quantity of the dispersing agent added to the slurry is at most several percent relative to the total volume of the powders and the dispersing medium, and the quantity of the added reactive substance is such that it reacts with this small quantity of the dispersing agent, the quantity of the reactive substance to be added can be minimized to a small quantity equal to the quantity of the dispersing agent by selecting a specific reactive substance. Therefore, the cured slurry produced can be degreased easily because the content of the organic materials to be burned; since the dispersing medium can be removed easily by drying during sintering is small.

This reactive substance may be added in the container for molding, or may be poured into the mold before the slurry is cured even after the addition of the reactive substance. In general, since the slurry is prepared through stirring and mixing, it often contains many air bubbles which are causes of the formation of void defects during the molded process. Therefore, those air bubbles must be removed before molding. It is therefore preferred that the removal of the air bubbles is quickly performed after the reactive substance is added and before the slurry is cured, or that the reactive substance is added during removing the air bubbles.

It is also preferred that the air bubbles are removed from the slurry alone before adding the reactive substance, because the time for removing air bubbles after adding the reactive substance can be reduced. Such air bubble removing can be performed generally by stirring the slurry slowly under a reduced pressure.

As the reactive substance to be added to the slurry, isocyanate monomers or isocyanate polymers containing —NCO groups are preferably used. Since an —NCO group reacts with water and produces carbon dioxide and changes to an —NH$_2$ group, the use of water as the dispersing medium must be avoided when such a compound is used in the present inventive process. Also, since active functional groups are present in epoxy compounds, lactone compounds, amine compounds, acid anhydrides, and isothionates, in addition to isocyanates, the slurry can be cured as in the case of isocyanates.

The reason why the slurry loses fluidity by the addition of a small quantity of such a reactive substance almost the same quantity of the dispersing agent is that the dispersibility of the dispersing agent lowers or disappears due to chemical reactions and/or difference in adsorbability to powders between the dispersing agent and the reactive substance, when the fact that the slurry is not cured even if such a reactive substance is added to the slurry containing no dispersing agent as shown in comparative examples described later.

For example, isocyanates have characteristics to react with substances having hydroxyl groups such as ethanol to form compounds having urethane bonds represented by —NCOO—. If a polyvalent alcohol is used in place of ethanol, a kind of urethane polymer is formed. In the present invention also, it is considered that the dispersibility of the dispersing agent is lost by the formation of a new organic compound or polymer between the dispersing agent and the reactive substance in the slurry, and the slurry loses its fluidity.

As shown in comparative examples described later, since the slurry in which a large quantity of relatively coarse particles are dispersed, and which does not require the addition of the dispersing agent, is not cured even if the dispersing agent and the reactive substance are added, the slurry is not cured under conditions when the dispersibility of the dispersing agent does not function even if the formation of the polymer occurs.

Or, it is also considered that the aggregation of the powders occurs and the slurry is cured when active functional groups such as —NCO groups are adsorbed on the surface of the powders peptized in the slurry, and the dispersing agent adsorbed on the surface of the powders is released in the dispersing medium, or the bonding conditions of organic molecules between the surface thereof change to lower the dispersibility of the dispersing agent. Furthermore, there is a possibility that reactions described above occur concurrently.

As described above, although the detailed mechanism of the curing of the slurry by the addition of a reactive substance has not been fully clarified, it is clear that the method for forming an article from powders according to the present invention is achieved through the interaction between the dispersing agent, the reactive substance, and the powders.

The present invention will be described in further detail referring to examples, but the present invention is not limited to these examples.

EXAMPLES

Table 1 shows the conditions for preparing slurries of Examples 1 through 4. In Examples 1 through 4, high-purity alumina having an average particle diameter of 0.9 μm was used as a powder, and petroleum ether was used as a dispersing medium. Furthermore, an alcoholic nonionic and an amine cationic dispersing agents were used as the dispersing agents. As the reactive substances, three types of isocyanate resins A, B, and C were used. In Table 1, the quantities of added reactive substances are shown as outer ratios relative to 100 of the total of other components.

a 200-milliliter polyethylene beaker, and the process of curing was observed. The results are shown in Table 1. In Example 1, the slurry was cured 3 minutes after the reactive substance was added. The cured article having a height of 25 mm and a diameter of 50 mm was removed from the beaker, and sintered in an electric furnace at a degreasing rate of 50° C./hour to 600° C. at a maximum temperature of 1,650° C. The linear shrinkage and the density of the sintered product was 16 percent and 3.94 g/cm$^3$, respectively.

In Example 2, the slurry was cured in 30 seconds, quicker than the slurry of Example 1. In Example 3, curing required 15 minutes. In Example 4, the slurry allowed to stand at room temperature was not cured in 3 days, but when it was heated to 140° C., it was cured in 30 minutes.

Next, as Comparative Examples 1 through 3, slurries were prepared and made to cure under conditions listed in Table 1. In Comparative Example 1, although the preparation of a slurry equal to those of Examples 1 through 4 was tried without using a dispersing agent, the powders aggregated to be clay-like, and the slurry cannot be produced. As the result, in Comparative Example 2 in which the concentration of the powders was lowered to prepare a slurry without using a dispersing agent, the slurry was not cured even if an isocyanate was added as a reactive substance to the slurry prepared. Furthermore, when glass beads having a diameter of 0.5 mm were used as the powders, a slurry could be prepared without using a dispersing agent. Thus, both a dispersing agent and the reactive substance were added to the obtained slurry, the viscosity of the slurry increased to some extent in 3 days, but the slurry was not cured.

From the results of experiments on examples and comparative examples described above, it was known that slurries were not cured even if only a reactive substance was

TABLE 1

| | Material type | Material name | Mixing ratio (vol. %) | Curing temperature/curing time |
|---|---|---|---|---|
| Example 1 | Powder | Alumina powder | 60 | Room temperature/3 min. |
| | Dispersing medium | Petroleum ether | 37 | |
| | Dispersing agent | Alcoholic nonionic | 3 | |
| | Reactive substance | Isocyanate resin A | 2 | |
| Example 2 | Powder | Alumina powder | 60 | Room temperature/30 sec. |
| | Dispersing medium | Petroleum ether | 37 | |
| | Dispersing agent | Amine cationic | 3 | |
| | Reactive substance | Isocyanate resin A | 2 | |
| Example 3 | Powder | Alumina powder | 60 | Room temperature/15 min. |
| | Dispersing medium | Petroleum ether | 37 | |
| | Dispersing agent | Alcoholic nonionic | 3 | |
| | Reactive substance | Isocyanate resin B | 2 | |
| Example 4 | Powder | Alumina powder | 60 | Room temperature/ (not cured) 140° C./30 min. |
| | Dispersing medium | Petroleum ether | 37 | |
| | Dispersing agent | Alcoholic nonionic | 3 | |
| | Reactive substance | Isocyanate resin C | 2 | |
| Comparative Example 1 | Powder | Alumina powder | 60 | (Slurry not produced) |
| | Dispersing medium | Petroleum ether | 40 | |
| | Dispersing agent | (Not added) | | |
| | Reactive substance | (Not added) | | |
| Comparative Example 2 | Powder | Alumina powder | 35 | (Not cured) |
| | Dispersing medium | Petroleum ether | 65 | |
| | Dispersing agent | (Not added) | | |
| | Reactive substance | Isocyanate resin A | 2 | |
| Comparative Example 3 | Powder | 0.5 mm dia. glass beads | 60 | (Not cured) |
| | Dispersing medium | Petroleum ether | 37 | |
| | Dispersing agent | Alcoholic nonionic | 3 | |
| | Reactive substance | Isocyanate resin A | 2 | |

In all of Examples 1 through 4, slurries having favorably low viscosity could be produced. A predetermined reactive substance was added to the slurry, the slurry was poured into added if no dispersing agent was present. Furthermore, it was found that even if both a dispersing agent and a reactive substance coexisted, the slurry was not cured unless the dispersing agent was under the condition to allow the dispersing agent to function to disperse the powders. It was therefore considered that the powders dispersed in the slurry as well as the dispersing agent and the reactive substance were involved in this curing of the slurry in the present invention.

Since the curing speed, that is, the speed of reaction differed depending on the combination of the dispersing agent and the reactive substance, it was found that the reaction between the dispersing agent and the reactive substance is varied, depending on the shape of the molecules involved and the type of functional groups used. Therefore, since the adjustment of time required to cure the slurry is possible by choosing the dispersing agent and the reactive substance described above in an optional combination, air bubbles may be removed completely by spending enough time to produce a uniformly cured, defect-free articles.

The method for forming an article from powders according to the present invention described above contributes to the reduction of the production costs, because the method is effective in molding an article from fine powders having a particle size of 1 μm or below, which have been considered to be difficult to mold due to the well-known property of easy aggregation without granulation of those fine powders, easily using inexpensive equipment. In the case of present invention, since the slurry can be cured by adding only a small quantity of a reactive substance to a slurry in which a high concentration of powders are uniformly dispersed, there are such advantages that: the molded article obtained contains only a small quantity of the resin to be burned during sintering, the powders are densely and uniformly packed, deformation due to sintering is prevented, and degreasing does not require a long time.

Also, since an easily flowing slurry can be cured in a mold having a complicated shape, the method of the present invention can be applied advantageously and widely to the manufacture of products which conventionally could be produced only by injection molding, or which required mechanical processing.

What is claimed is:

1. A method for manufacturing a sintered article, comprising the steps of:

preparing a slurry consisting essentially (i) at least one powder selected from the group consisting of ceramic powder, metal powder and glass powder, (ii) a dispersing medium, and (iii) a dispersing agent in an amount sufficient to disperse the powder in the dispersing medium;

adding a reactive substance to the slurry;

introducing the slurry into a mold, wherein the reactive substance is present in the slurry in an amount sufficient to react with the dispersing agent to cause the dispersing effect of the dispersing agent to at least substantially decrease, to thus provide a green body having sufficient mechanical strength to allow handling of the green body after removal from the mold;

removing the green body from the mold; and firing the green body to form the sintered article.

2. The method of claim 1, wherein the dispersing medium comprises an organic solvent, and the dispersing agent is at least one compound selected from the group consisting of amine compounds, organic compounds having hydroxyl groups, alcoholic esters, and organic metal complex compounds.

3. The method of claim 1, wherein the reactive substance is at least one compound selected from the group consisting of isocyanates, epoxy compounds, lactone compounds, amine compounds, acid anhydrides and isothionates.

4. The method of claim 2, wherein the reactive substance is at least one compound selected from the group consisting of isocyanates, epoxy compounds, lactone compounds, amine compounds, acid anhydrides and isothionates.

5. The method of claim 1, wherein said reactive substance consists essentially of an isocyanate.

6. The method of claim 2, wherein said reactive substance consists essentially of an isocyanate.

* * * * *